(12) United States Patent
Challener et al.

(10) Patent No.: US 8,667,263 B2
(45) Date of Patent: Mar. 4, 2014

(54) SYSTEM AND METHOD FOR MEASURING STALENESS OF ATTESTATION DURING BOOTING BETWEEN A FIRST AND SECOND DEVICE BY GENERATING A FIRST AND SECOND TIME AND CALCULATING A DIFFERENCE BETWEEN THE FIRST AND SECOND TIME TO MEASURE THE STALENESS

(75) Inventors: David C. Challener, Raleigh, NC (US); Peter S. Kruus, Clarksville, MD (US)

(73) Assignee: The Johns Hopkins University, Baltimore, MD (US)

( * ) Notice: Subject to any disclaimer, the term of this patent is extended or adjusted under 35 U.S.C. 154(b) by 286 days.

(21) Appl. No.: 13/026,786

(22) Filed: Feb. 14, 2011

(65) Prior Publication Data

US 2011/0213953 A1 Sep. 1, 2011

Related U.S. Application Data

(60) Provisional application No. 61/303,870, filed on Feb. 12, 2010, provisional application No. 61/381,160, filed on Sep. 9, 2010.

(51) Int. Cl.
*H04L 7/00* (2006.01)
*H04N 5/932* (2006.01)
*G06F 11/00* (2006.01)

(52) U.S. Cl.
USPC ............... 713/2; 375/371; 386/201; 714/708; 726/5

(58) Field of Classification Search
USPC ............... 375/371; 386/201; 714/708; 726/5; 713/178; 370/498
See application file for complete search history.

(56) References Cited

U.S. PATENT DOCUMENTS

| 7,012,982 B1 * | 3/2006 | Basch et al. ................... 375/371 |
| 7,412,596 B2 | 8/2008 | Challener et al. |
| 7,620,824 B2 | 11/2009 | Iino |
| 7,924,884 B2 * | 4/2011 | Kailash et al. ................. 370/498 |
| 8,209,744 B2 * | 6/2012 | Zhu et al. ........................... 726/5 |
| 8,261,136 B2 * | 9/2012 | D'Abreu et al. ............... 714/708 |
| 8,285,107 B2 * | 10/2012 | Wang et al. .................... 386/201 |

(Continued)

FOREIGN PATENT DOCUMENTS

| WO | WO 2007148258 | 12/2007 |
| WO | WO 2007149154 A2 * | 12/2007 |
| WO | WO 2009109811 | 11/2009 |

*Primary Examiner* — Chun Cho
*Assistant Examiner* — Aurel Prifti
(74) *Attorney, Agent, or Firm* — Noah J. Hayward (57) ABSTRACT

A method is provided for determining with a first device, staleness of attestation measurements at a second device. The method includes booting up the second device at a first time, the second device having a communication portion, a security portion, a basic input/output system and a trusted protection module. Further, the method includes generating an initial counter based on the booting up of the second device at the first time. A current counter is then generated based on a second time after the first time. The method additionally includes providing a request to the second device from the first device, the request requesting booting information and current information, the booting information being based on the initial counter, the current information being based on the current counter. Still further, the method includes providing a response to the first device from the second device, the response including the booting information and the current information. Finally, the method includes determining, via the first device, the generated initial counter and the current counter based on the response.

15 Claims, 4 Drawing Sheets

(56) References Cited

U.S. PATENT DOCUMENTS

| | | | |
|---|---|---|---|
| 8,499,161 B2 * | 7/2013 | Cha et al. .................. | 713/178 |
| 2006/0074600 A1 | 4/2006 | Sastry et al. | |
| 2008/0046758 A1 | 2/2008 | Cha et al. | |
| 2008/0301457 A1 | 12/2008 | Uesugi et al. | |
| 2009/0070589 A1 | 3/2009 | Nayak et al. | |
| 2009/0178138 A1 | 7/2009 | Weiss et al. | |
| 2009/0204964 A1 | 8/2009 | Foley et al. | |
| 2009/0300348 A1 | 12/2009 | Acilcmez et al. | |
| 2010/0011214 A1 | 1/2010 | Cha et al. | |

* cited by examiner

SYSTEM AND METHOD FOR MEASURING STALENESS OF ATTESTATION DURING BOOTING BETWEEN A FIRST AND SECOND DEVICE BY GENERATING A FIRST AND SECOND TIME AND CALCULATING A DIFFERENCE BETWEEN THE FIRST AND SECOND TIME TO MEASURE THE STALENESS

CROSS-REFERENCE TO RELATED APPLICATIONS

The present application claims priority from U.S. Provisional Application No. 61/303,870 filed Feb. 12, 2010, and U.S. Provisional Application No. 61/381,160 filed Sep. 9, 2010, the entire disclosures of which are incorporated herein by reference.

STATEMENT OF GOVERNMENTAL INTEREST

This invention was made with government support under contract number H98230-04-D-0305 awarded by the National Security Agency (NSA). The government has certain rights in the invention.

BACKGROUND

The present invention relates to the field of computer security, in particular, attesting the state of computer platforms using trusted computing.

A primary goal of trusted computing is ensuring that computers behave in known and predictable ways, which creates a safer computing environment. The Trusted Computing Group (TCG) is a not-for-profit organization formed to develop, define and promote open, vendor-neutral, industry standards for trusted computing building blocks and software interfaces across multiple platforms. The TCG has defined mechanisms for achieving trusted computing using hardware and software components that identify trusted software and enforce behavior so that only known and trusted software can execute. TCG specifications for the hardware based Trusted Platform Module (TPM), a PC Client (PC), and Trusted Network Connect (TNC) specifications define such mechanisms. The TPM is both the name of a published specification detailing a secure cryptoprocessor that can store cryptographic keys that protect information, as well as the general name of implementations of that specification, often called the "TPM chip" or "TPM Security Device." The TNC is an open architecture for network access control, promulgated by the TCG.

One such mechanism involves generating cryptographic hashes of static executable files prior to their execution in order to uniquely identify the software so that it can be compared against a list of hashes of trusted software files. A cryptographic hash function is a deterministic procedure that takes an arbitrary block of data and returns a fixed-size bit string, the cryptographic hash value, such that an accidental or intentional change to the data will change the hash value. For example, when a computer boots, a cryptographic hash function may be performed on values within predetermined registers of the computer's basic input/output system (BIOS). The resulting hash value is cryptographically signed and stored by the computer. If the computer reboots, a new cryptographic hash function will be computed on the values and the resulting hash value will be cryptographically signed and stored by the computer. In the case when the hash values are stored inside the TPM, these values are not signed.

Unwanted, e.g., viral, software that is executed on the computer may change the data on the computer files, thus creating a new hash value. The difference between the new hash value and the old hash value will be an indicator that the computer has been rebooted or hacked. This would be a red flag that unwanted software has infiltrated the computer. As such, the computer may no longer be trusted.

Unknown and therefore untrusted software can be blocked from execution locally or reported to a remote party that can make an assessment of the computer's state. If the computer is deemed to be running in an untrusted state, it might be restricted from accessing network or other resources. Decisions on what software should be trusted can be evaluated locally or remotely through a process called attestation.

The process of measuring or identifying trusted software on a computer can be rooted in software tied to the lowest layers of the computer's hardware including its BIOS and its TPM. PC defines the trusted software known as root of trust for measurement (RTM) located in the boot block of the BIOS software.

Although RTM measurements are taken and recorded in a well-defined sequence, there are no protocols or mechanisms currently defined to associate an absolute or relative time with these measurements. Therefore, their freshness during an attestation exchange cannot be verified.

Hash values reported through attestation can be used to identify the software or configuration files loaded during the booting of the computer and its operating system. In the case of Integrity Measurement Architecture (IMA), executables, configuration files, and libraries loaded into memory that are identified by a configurable policy are hashed and extended into platform configuration registers (PCRs) prior to loading or execution. PCRs are TPM registers for storing platform configuration measurements. The hashes are also recorded in a manifest file for later reporting to the attester.

The existing attestation protocols defined by TCG include a nonce to prove that the quoting of the measurements is fresh. In security engineering, a nonce is an abbreviation of number used once. It is often a pseudo-random number issued in an authentication protocol to ensure that old communications cannot be reused. To ensure that a nonce is used only once, it should be time-variant (including a suitably fine-grained timestamp in its value), or generated with enough random bits to ensure a probabilistically insignificant chance of repeating a previously generated value. However, the nonce mechanism alone does not provide an indication of when the measurements were actually taken. As a result, there is a possibility of getting a fresh quote of stale measurements. Stale measurements may not accurately reflect the current state of the computer.

Unfortunately, freshness in reporting does not guarantee freshness in measurement. When the elapsed time between the measurement of software and the reporting of the measurement values of resulting PCRs to a remote attester is significant, i.e., possibly days or even months in the case of a server, the measurement may no longer accurately reflect the state of the running processes and may be considered stale. In fact, it is widely believed that a longer time between the time of measurement and time of reporting corresponds to a reduction in our assurance that the measurement accurately identifies the current executing software. The potential for compromise increases once the software executes in system memory.

What is needed is a method for measuring staleness of TPM measurements such that attestation decisions can be made correctly.

BRIEF SUMMARY

The present invention provides a system and method for measuring staleness of TPM measurements such that attestation decisions can be made correctly.

In accordance with an aspect of the present invention, a method is provided for determining with a first device, staleness of attestation measurements at a second device. The method includes booting up the second device at a first time, the second device having a communication portion, a security portion, a basic input/output system and a trusted protection module. Further, the method includes generating an initial counter based on the booting up of the second device at the first time. A current counter is then generated based on a second time after the first time. The method additionally includes providing a request to the second device from the first device, the request requesting booting information and current information, the booting information being based on the initial counter, the current information being based on the current counter. Still further, the method includes providing a response to the first device from the second device, the response including the booting information and the current information. Finally, the method includes determining, via the first device, the generated initial counter and the current counter based on the response.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

The present invention provides a system and method for reporting the relative age of a measurement without any modifications to the TPM design in a way that can be proven by a third party. The existing time capabilities of TPM are leveraged in order to establish a temporal reference point for when measurements were taken and recorded into TPM's registers.

Provably fresh measurements provide a solution to the stale measurement quandary. The tickCount and tickStamp capabilities of TPM are utilized to establish a temporal reference point that can be cryptographically associated with measurements protected by the TPM in a way that can be verified by a remote attester. By associating a temporal reference point with measurements protected in the TPM, the relative time a measurement that was recorded into the TPM can be proven. The measurements protected by TPM are associated with time by extending a representative hash of the time into the targeted PCR.

In an example embodiment, hashes are loaded into PCRs by using an iterative one-way SHA-1 (Secure Hash Algorithm-1) hash function called an extend operation. Once a hash has been loaded, it cannot be reset to a previous state since the hashes can be read out of the TPM. Additionally, most of PCRs inside TPM can only be reset to their original value by turning off power to TPM hardware. This ensures that PCRs reflect the state of the computer since its initial boot and has not been modified.

A computer system in accordance with an aspect of the present invention, where an attester wants to make an assessment of the state of an attestee, such that only known or trusted software can be executed will now explained below with reference to FIG. 1.

Figure 1:
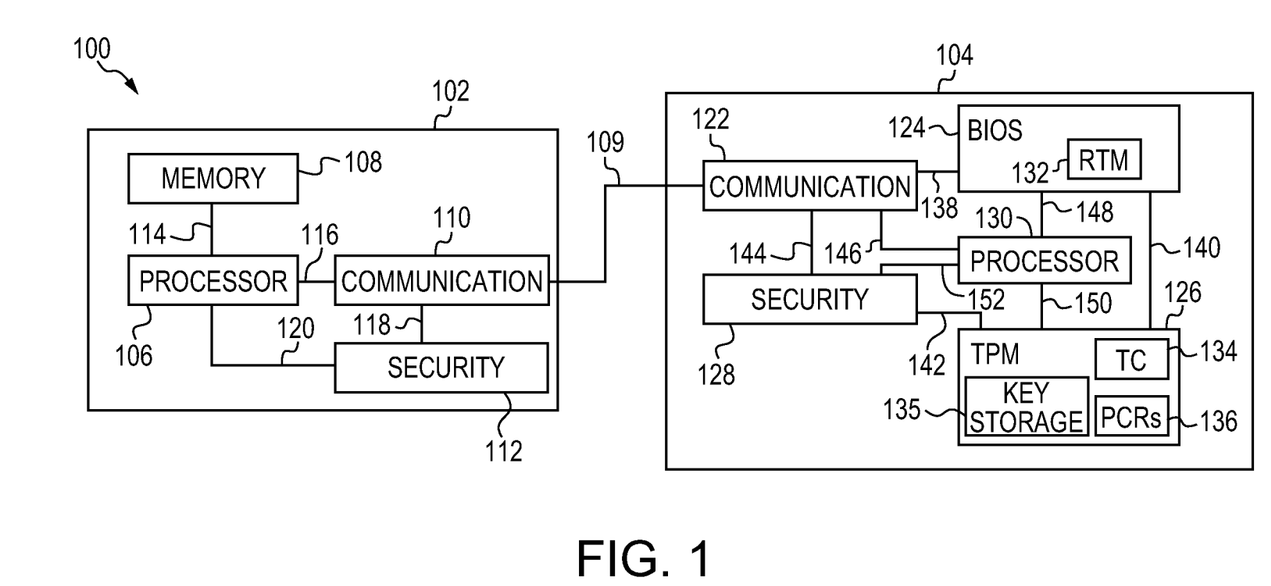
FIG. 1 illustrates a computer system in accordance with aspects of the present invention.

FIG. 1 illustrates a computer system 100 in accordance with aspects of the present invention.

As illustrated in the figure, computer system 100 includes an attester 102, and an attestee 104. In one example, attester 102 may be a server and attestee 104 may be a client. Attester 102 includes a processor 106, a memory 108, a communication module 110 and a security module 112. Attestee 104 includes a communication module 122, a BIOS 124, a TPM 126, a security module 128, and a processor 130.

Each of the elements of attester 102 are illustrated as individual devices, however, in some embodiments at least two of processor 106, memory 108, communication module 110 and security module 112 may be combined as a unitary device. Further, in some embodiments, at least one of processor 106, memory 108, communication module 110 and security module 112 may be implemented as a tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Similarly, each of the elements of attestee 104 are illustrated as individual devices, however, in some embodiments at least two of communication module 122, BIOS 124, TPM 126, security module 128 and processor 130 may be combined as a unitary device. Further, in some embodiments, at least one of communication module 122, BIOS 124, TPM 126, security module 128 and processor 130 may be implemented as a tangible computer-readable media for carrying or having computer-executable instructions or data structures stored thereon.

Attester 102 and attestee 104 communicate through a handshake signal 109, for example, for exchanging keys and transfer of data, etc.

Processor 106 is operable to communicate with memory 108 via signal 114 for storage of any data. Processor 106 is also operable to communicate with security module 112 via signal 120. Security module 112 is responsible for generating any keys used by attester 102, for example, when requesting a measurement of PCRs from attestee 104. Processor 106 is also operable to communicate with communication module 110 via signal 116.

Communication module 110 is operable to receive a key from security module 112 via signal 118 and also a request for PCR quotes from processor 106, and to communicate with attestee 104 via signal 109.

Processor 130 is operable to communicate with communication module 122, security module 128, BIOS 124 and TPM 126 to provide controls to these modules as needed. Processor 130 may include an internal or external memory.

Communication module 122 interfaces with BIOS 124 via signal 138. Communication module 122 also interfaces with security module 128 via signal 144.

TPM 126 further includes an internal counter called TC (tick counter) 134, a key storage module 135 and memory registers called PCRs 136. TC 134, key storage 135 and PCRs 136 are illustrated as individual devices, however, in some embodiments they may be combined as a unitary device. Further, in some embodiments, at least one of TC 134, key storage module 135 and PCRs 136 may be implemented as a tangible computer-readable media for carrying or having computer-executable instructions or data structures stored thereon.

BIOS 124 includes the BIOS software and further includes an RTM 132. RTM 132 is a trusted software as defined by PC and is used for kick starting the measurements of other trusted software components. RTM 132 begins an inductive chain of software identification where hashes of executable files are loaded into PCRs 136 via signal 140.

Security module 128 is operable to generate any keys required for attestation process by TPM 126. It interfaces with TPM 126 via signal 142.

PCRs 136 are also used to store information about the boot sequence of attestee 104. In particular, PCRs 136 can record information about the history of the boot sequence, BIOS 124, the configuration settings of BIOS 124, and the boot configuration for BIOS 124. Numbering of PCRs 136 is standard as specified by PC put out by TCG. In this example, PCRs are grouped as PCRs 136 but individual PCR will be referred to as PCR-1, PCR-2 . . . PCR-19 and so on.

TPM 126 resets TC 134 on power-up, which increments by a tickCount at a fixed rate to an internal clock inside TPM 126. Upon power-up, when TC 134 is reset to zero, TPM 126 also generates and stores a 20-byte random value called a tickNonce. For purposes of discussion, a 20-byte word is used for a tickNonce, but any other sized word may be used. TC 136 is internally associated with the tickNonce. TPM 126 can prove that a tickCount and tickNonce are associated with TPM 126 by signing the combination with an internally protected signing key (SK) such as an Attestation Identity Key (AIK), provided by security module 128. The signature is also calculated over an external 20-byte anti-replay nonce passed into TPM 126 along with another 20-byte external "blob" of data.

The process of associating the current tickCount, tickNonce, the external blob, and anti-replay nonce using a digital signature is called tick stamping. The resulting tickStamp can be exported from TPM 126 along with all the components that were signed and the signature from the signing key as follows:

$$\text{timestamp}=\text{Sign}_{SK}(\text{external blob}\|\text{anti-replay nonce}\|\text{tickCount}\|\text{tickNonce}).$$

The integrity of this structure can be verified with a corresponding TPM 126 generated public key. If two tickStamps from the same TPM are extracted during the same power cycle for comparison (i.e., have the same tickNonce), the difference of their tickCounts equals the number of ticks that have elapsed between the generation of the tickStamps. This difference can be converted to time by determining the ratio of ticks to seconds.

Key storage module 135 stores and protects keys for TPM 126. In a remote attestation protocol such as the one defined in TNC, TPM 126 serves as a root of trust for reporting (RTR) by cryptographically signing the contents of PCRs 136 using a 1024-bit or 2048-bit RSA key that is internally generated and protected by TPM 126. RSA, which stands for Rivest, Shamir and Adleman, is an algorithm that is used for public key cryptography. Attester 102 initiates a TPM quote function of selected PCRs 136. TPM 126 returns the value of selected PCRs 136 along with its signature over the value. The signature and thus the integrity of selected PCRs 136 can be verified using the corresponding public key generated by TPM 126.

An external random number or a nonce may be included as input into the quoting function as a way of ensuring the reporting of selected PCRs 136 values is fresh and in response to a specific external request. Once the integrity of selected PCRs 136 has been verified with the quote, attester 102 can then use selected PCRs 136 value to verify the integrity of the log or manifest file, which describes the hash values that were extended into selected PCRs 136. Once the log has been verified with selected PCRs 136, attester 102 can use the log to help understand the state of the computer as represented by the details described in the log.

There are two basic protocols for performing attestation defined by TCG—one that uses a static root of trust for measurement (SRTM), which is associated with the physical boot of the system, and another using a dynamic root of trust of measurement (DRTM) which is used for measurement of a dynamic launch of a secure loader, which is usually of a hypervisor. They are both part of RTM 132. DRTM can be entered multiple times per physical boot, and does not reset the power to TPM 126. As a result, both the tickNonce and the tickCount together must be used to distinguish between measurements of the DRTM, were it to go through multiple measurement cycles.

SRTM roots a chain of trust that starts with the boot block of the BIOS, which is considered immutable. The boot block code hashes the rest of the BIOS and extends the results into PCR-0. Additionally, the boot block hashes the configuration settings of the BIOS and extends the results into PCR-1. After this, the rest of the BIOS software is passed control of the system in order to perform its many functions. One function it performs is extending the hash of the any firmware in peripherals that are on the system before they are given any control of the system. The firmware hashes are extended into PCR-2 and its configuration settings into PCR-3. Before the BIOS passes control to the next piece of code, the Master Boot Record (MBR), it itself is measured and the results extended with its configuration settings into PCRs-4 and PCR-5. This process establishes a chain of trust where each section of code measures the next section of code before it is passed control of the system.

During attestation, if the PCR values recorded in PCR-0 through PCR-5 match known values of trusted code, then the recipient of those values can be assured that the system has performed its allotted task and can then believe the accuracy of the next value in the trust chain.

The DRTM process roots a chain of trust starting sometime after SRTM and the boot of the system. In this chain, processor 130 itself forms a root of trust, using a special instruction that puts the system into a known, isolated state. In this state, no other hardware or software is able to affect the mechanisms processor 130 uses to measure special software called an authenticated code (AC) module. This state also allows processor 130 to set PCR-17, PRC-18 and PCR-19 to a value of all zeros. When booted, those PCRs are set to all 1's. This module, after being verified as having been signed by processor 130 manufacturer, is then given control of processor 130 and begins to measure the next set of code, which is usually a hypervisor loader, a hypervisor and host OS, into resettable PCR-17 and PCR-18. Then control is passed from the AC module to the hypervisor loader. In this way a chain of trust is again created, and a party attesting the measurements will be able to look at the chain of trust and assess how trustworthy he believes the software to be.

Although both SRTM and DRTM measurements are taken and recorded in a well-defined sequence, there are no protocols or mechanisms currently defined to associate an absolute or relative time (e.g., tickCount) with these measurements to indicate when those measurements were taken. Therefore, their freshness during an attestation exchange cannot be verified.

Hash values reported through attestation can be used to identify the software or configuration files loaded during the booting of the computer and its operating system. In the case of Integrity Measurement Architecture (IMA), executables, configuration files, and libraries loaded into memory that are identified by a configurable policy are hashed and extended into PCR-10 prior to loading or execution. The hashes are also recorded in a manifest file for later reporting to attester 102. In the case of the use of DRTM, additional measurements of a running hypervisor and state of the system are made sometime after the boot sequence into PCRs 136, which are resettable under controlled conditions.

The existing attestation protocols defined by TCG include a nonce to prove that the quoting of the measurements is fresh; however, the nonce mechanism alone does not provide an indication of when the measurements were actually taken. As a result, there is a possibility of getting a fresh quote of stale measurements. Stale measurements may not accurately reflect the current state of the computer platform 100.

Unfortunately, freshness in reporting does not guarantee freshness in measurement. When the elapsed time between the measurement of software and the reporting of the measurement values of resulting PCRs to a remote attester is significant, i.e., possibly days or even months in the case of a server, the measurement may no longer accurately reflect the state of the running processes and may be considered stale. In fact, it is widely believed that a longer time between the time of measurement and time of reporting corresponds to a reduction in our assurance that the measurement accurately identifies the current executing software. The potential for compromise increases once the software executes in system memory.

An example flow chart of the proposed method, in accordance with an aspect of the present invention is explained below using FIG. 2.

Figure 2:
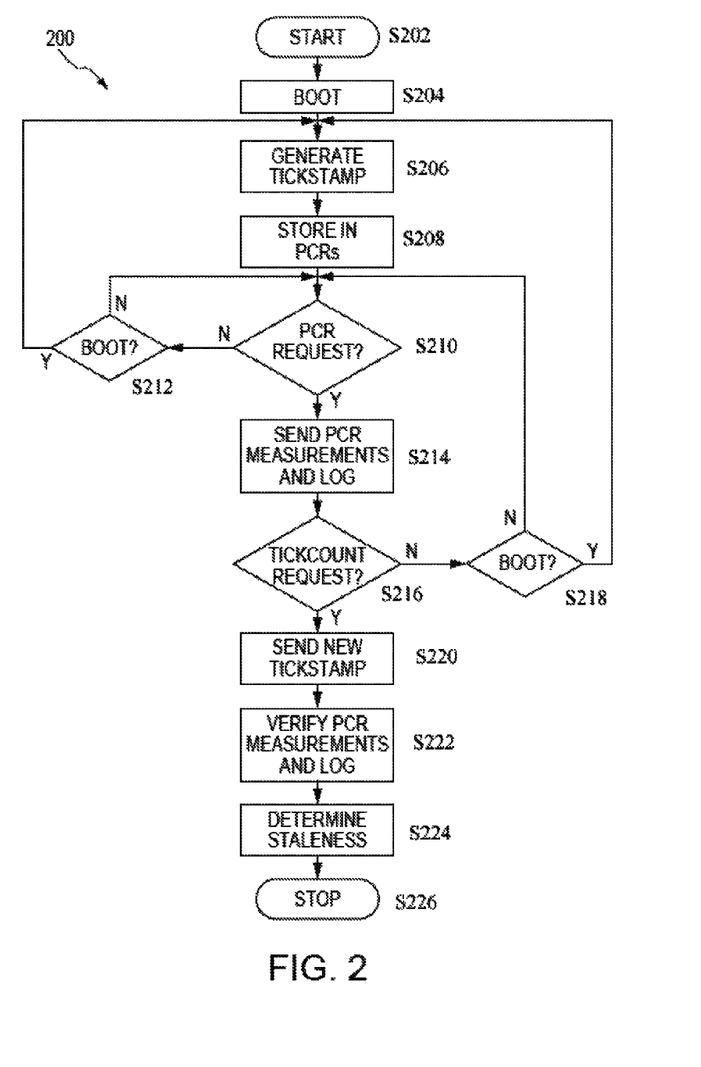
FIG. 2 illustrates an example method in accordance with an aspect of the invention.

FIG. 2 illustrates an example method 200 in accordance with an aspect of the invention.

Method 200 starts (S202) and attestee 104 boots up (S204). For example, BOIS 124 initiates boot sequence, which includes loading software and/or configuration files. PCRs 136 and tickCounter 134 may be reset to their initial values.

A tickStamp is then generated (S206). For example, security module 128 generates a nonce every time BIOS 124 is powered on. TickCounter 134 provides its initial value from boot up to security module 128. Security module 128 uses the nonce to cryptographically sign the initial tickCount to generate a tickStamp. Accordingly, the tickStamp may be authenticated, by using the nonce as will be described later.

The tickStamp is then stored in a PCR (S208). For example, security module 128 may store the tickStamp in at least one PCR of PCRs 136. In another embodiment, the tickStamp can be integrated in with another PCR of PCRs 136 used to store system measurements as will be discussed later.

In this example, the tickStamp generation (S206) and the storage of the tickStamp (S208) are executed after boot sequence (S204), however in some embodiments, the tickStamp generation (S206) and the storage of the tickStamp (S208) may be executed with the boot sequence (S204).

It is then determined whether there is a request for the PCR values (S210). For example, attester 102 may send a request to attestee 104. In an example embodiment, when attestor 102 and attestee 104 initially communicate, a handshake is performed wherein public keys may be exchanged for purposes of enabling secure, authenticated communication. During the handshake, security module 128 of attestee provides the nonce to security module 112 of attester 102. Security module 112 then uses the nonce to generate the request for the PCR values. Communication portion 110 then transmits the request to communication portion 122.

If there is no request for PCR measurements, attestee 104 waits for a request. While waiting, it is determined whether attestee re-boots (S212). If there is no boot then attestee 104 keeps waiting to receive a PCR measurement (S210). In case a boot has occured, a new tickStamp is generated (S206). As mentioned above, in the case of intrusive malware, the user of attestee may be unaware of an instillation of malware, which results in a reboot. However, in accordance with an aspect of the present invention, evidence of the reboot will be recorded with a corresponding tickstamp.

Returning to the determination of whether there is a request for the PCR values (S210), if there is a request for PCR measurements, the attestee may send the PCR measurements (S214). TPM 126 in attestee 104 cryptographically signs the contents of PCRs 136 and returns the PCR values along with its signature over the value. TPM 126 also sends a log file (which includes tickStamp from the last boot, which is the current boot cycle) along with the PCR values. The log file is used to interpret the PCR values.

Once attester 102 receives the PCR values sent by attestee 104, attester 102 may request for the tickCount to check the freshness of the PCR values. In particular, as mentioned above, the PCR values may not accurately reflect the state of attestee 104 if they are stale, e.g., very old. Accordingly, attester 102 should at some point request a current tickCount, which will be used to determine the freshness of the PCR values.

It is then determined whether there is a request for a tickCount (S216). For example, attester 102 may send a request to attestee 104. In an example embodiment, security module 112 then uses the nonce to generate the request for the tickCount. Communication portion 110 then transmits the request to communication portion 122. In some cases, attester 102 can request to get a tickCount when the request for the PRC values is sent. In some cases, attester 102 can request to get a tickCount at some time after attestee boots up. In some cases, attester 102 can send a request for attestee to send a tickCount at a later predetermined time.

If there is no request for a tickCount, attestee 104 waits for a request. While waiting, it is determined whether attestee re-boots (S218). If there is no boot then attestee 104 keeps waiting to receive a tickCount request (S216). In case a boot has occurred, a new tickStamp is generated (S206). As mentioned above, in the case of intrusive malware, the user of attestee may be unaware of an instillation of malware, which results in a reboot. However, in accordance with an aspect of the present invention, evidence of the reboot will be recorded with a corresponding tickstamp.

Returning to the determination of whether there is a request for a tickCount (S216), if there is a request for a tickCount, the attestee may send the tickCount (S220). In an example embodiment, tickCounter 134 provides a current tickCount to security portion 128. Security portion 128 signs the tickCount using a private key and the nonce to generate a current tickStamp.

Then the response from the attestee is verified (S222). In an example embodiment, attester 102 verifies response from attestee 104 using the public key provided during the handshake. In an example embodiment, security module 112 uses the public key and the nonce decrypt the response and verify the authenticity. Once decrypted and authenticated, processor 106 uses PCR values to verify the integrity of the log file which includes the hash values extended in to PCRs 136.

Next, attester measures the staleness of the PCR values (S224). Once attester 102 verifies the measurements and the log file, attester 102 can calculate the time for the new tickCount and the old tickCount and determine the time difference between the two by dividing it by a parameter. From the time difference, freshness of the measurements can be determined.

At this point, method 200 stops (S226).

The proposed method as described in FIG. 2, can be used for determining freshness of measurements for remote attestation of attestee 104 by attester 102 of FIG. 1.

An aspect of the present invention makes use of the relative time of the tickcount within tick counter 134 as the time source for establishing a temporal reference point for measurements recorded in PCRs 136. There are several forms of this counter that can be utilized. However, before any of them can be used by extension into TPM 126, they may be converted into a 160-bit value. SHA-1 hashing algorithm is proposed and the resulting hash of a time source of TPM 126 is called a tickHash. The one-way nature of a PCR extension function of PCRs 136, makes the extension of a tickHash into a PCR of PCRs 136 become a temporal reference point for measurements, recorded before and after the tickHash. It is always the case that measurements extended into a PCR of PCRs 136 after the tickHash are no staler than the tickHash itself; similarly, measurements recorded before the tickHash must be older than the tickhash.

Potential time formats of TPM 126 for conversion into a tickHash might include the following: 1) a hash of only the current tickCount, 2) a hash of the complete tickStamp structure which includes the signature of TPM 126 and the current tickCount, or 3) a hash of the signature of TPM 126 extracted from the tickStamp (which covers the tickCount in the tickStamp structure). To generate the 160-bit tickHash, the internal SHA-1 cryptographic function of TPM 126 could be used, or could be generated external to TPM 126 using a software (or hardware) cryptographic implementation (e.g., openssl). Generating the tickHash using a time structure that includes the signature of TPM 126 (i.e., either option 2 or 3) allows a remote attestor, e.g., attestor 102, to verify that the count was derived by a TPM in a trusted state (as proved by the PCRs). The time values in TPM 126 used to generate the tickHash must be recorded in a log or manifest so that the final hash can be re-generated by a remote attester, e.g. attestor 102, for verification of the integrity of the PCR log and to compute the relative freshness in its measurements (see below).

In one example embodiment, the relative freshness of a tickHash, $T_{fresh}$ is computed by computing the difference between the tickCount from a recorded tickHash, $tickCount_A$, and the current tickCount, $tickCount_{cur}$:

$$T_{fresh} = tickCount_{cur} - tickCount_A$$

More generically, the freshness between any two measurements is the difference between their tickCounts (with the same tickNonce), where tickCount is relatively newer than $tickCount_y$:

$$T_{fresh} = tickCount_x - tickCount_x$$

Extending the tickHash into a PCR establishes a reference point that can establish the relative freshness of other PCR recorded measurements to boot time. When establishing freshness of a tickHash extended into a PCR, the attester may first verify integrity of the PCR and then the integrity of the PCR log or manifest. In order to verify the integrity of information contained within a PCR log, an attester may hash the values extended into the PCR in order they were extended, from the first value to the last. The final hash may be equal to the corresponding PCR value returned in a TPM signed quote that was verified using the TPM's public signing key (e.g., AIK public key or certificate). To verify the time associated with PCR measurements, the tickHash that was extended into a PCR may have also been included in the log file in the temporal order it was extended into the TPM. Therefore, the data structures, or some representation of them, that comprised the tickCount or tickStamp may be recorded in the log in order to regenerate the tickHash and verify the PCR. Once the PCR has been verified, the relative freshness of its measurements can be deduced from their temporal location in the log file in relationship to the extended tickHash.

Figure 3:
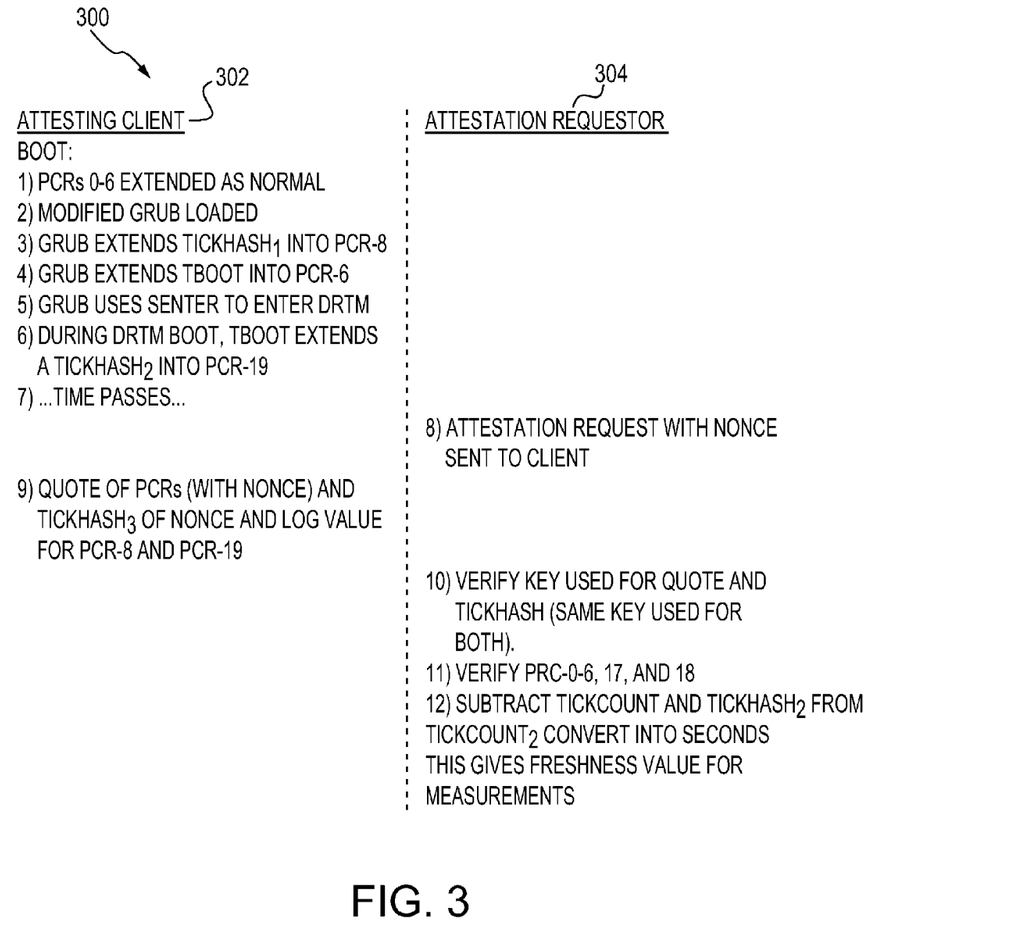
FIG. 3 illustrates an example of using provably fresh measurements for remote attestation in accordance with an aspect of the present invention.

FIG. 3 illustrates an example 300 of using provably fresh measurements for remote attestation in accordance with an aspect of the present invention.

As illustrated in the figure, example 300 includes an attesting client 302 and an attestation requestor 304.

At boot, attesting client 302 loads configuration files and PCRs. A boot loader, for example, Grub, extends PCRs as part of boot sequence. Also, in an example embodiment, SRTM and DRTM protocol is followed. Note that in step 3, tickHash$_1$ is extended in to PCR-8, and later on in step 6, tickHash$_2$ is extended in to PCR-19, which implies that the PCR log maintains the order in which PCRs were extended. Once the boot sequence is complete, attesting client 302 waits for an attestation request.

Attestation requestor 304 then sends an attestation measurement request with a random nonce to attesting client 302 in step 8.

Attesting client 302 returns the quote of PCRs including nonce, tickHash$_3$ of nonce, and log values for PCR-8 and PCR-19 in step 9. Note that the log file includes tickCount and tickStamp corresponding to each tickHash.

Attestation requestor 304 verifies TPM's public signing key, which was the same key used for both PCR quote and tickHash in step 10.

Attestation requestor 304 computes and verifies PCRs and PCR logs in step 11.

Attestation requestor 304 can now subtract $tickCount_{PCR}$ from recorded tickHash$_2$ in the PCR log from tick- Count$_{TS}$ protected by the returned tickStamp from tickHash$_3$, which should be returned in relative real-time. By converting the counts to time (in seconds), attestation requestor 304 can determine how long it has been since the measurement was taken, T$_{fresh}$.

$$T_{fresh} = tickCount_{TS} - tickCount_{PCR}$$

As discussed above using FIG. 3, relative freshness of measurements for remote attestaion can be verified by extending tickHash into a PCR in the temporal order.

Note that the technique behind provably fresh measurements also solves a "reboot in the middle" problem associated with remote attestation. This problem is defined by a computer being attacked after it has attested to be in a trustworthy state. After the attacker completes their nefarious task, they reboot the machine back into the trustworthy state unbeknownst to the remote attester. The technique behind provably fresh measurements solves this problem by recording the tickNonce associated with a tickCount. Because a reboot in the middle would have different tickNonce's associated with the tickStamp's taken before and after the reboot, the reboot would be noticeable to the remote attester. A remote attester can distinguish between boot sequences by comparing the tickNonce from PCRs reported before and after the reboot. The attester is able to detect the reboot even if the tickStamp recording of the middle (bad) boot sequence is faked—because in the "reboot in the middle" attack, it is the two good boot sequences that need to be distinguished.

The basic approach of generating a tickHash in order to associate time, i.e., the tickCount, with a measurement, can be applied in two basic scenarios. In one method called Establishing Relative Boot Time, any modifications to current trusted code in the BIOS or any modifications to the TPM to establish freshness of measurements are not required. A second approach, called Law of Superposition, integrates the provably fresh measurement technique of extending tickHashes together with other measurement software to establish a relative time of measurements recorded in PCRs. First method of Establishing Relative Boot Time is discussed below.

It might be considered ideal to extend a tickHash into each PCR before it is otherwise extended by other measurements to establish temporal references for each measurement. Although this would provide proof that subsequent measurements were extended after the tickHash was created, there are a number of problems encountered with this approach in current deployed systems.

First, changing a RTM in order to extend the tickHash would require a change to the PC Client specification, as well as requiring updates to the BIOS. It would also affect programs like Tboot that already are using a DRTM to load PCR-17 and PCR-18 with measurements of a dynamic boot sequence.

Secondly, adding a dynamic element, e.g., the tickCount, into a PCR measurement makes the resulting PCR measurement more dynamic by including an incrementing counter. Because the PCR values would always be different, this may increase the amount of effort needed to verify a PCR measurement by a remote attester, e.g., a Trusted Network Connect Radius Proxy, to determine if an attesting client is in a known good state. The current setup of PCR measurements has "nearly static" measurements being extended into even PCRs and configuration settings which may be more dynamic measured into odd PCRs. Thus the BIOS firmware is measured into PCR 0 and the configuration settings of the BIOS are measured into PCR 1.

In general, it is assumed that measurements can be considered good if they are "relatively" fresh. That is, if the concern is that the system could have been subverted within seconds of its having booted, then the freshness of the measurements are irrelevant. Therefore, it is assumed that measurements of critical components need only to have been taken a few seconds from the system having fully booted. In this case, it can be assumed that the system has booted into a trusted state, which is proved by examining the current PCR measurements. As such, in order to avoid having to change either the BIOS or the ACM modules used in Tboot to guarantee integrity of the DRTM, time measurement are allowed to be done by the operating system's kernel. Tboot (Trusted Boot) is a conventional open source, pre-kernel/VMM (virtual memory manager) module that performs a measured and verified launch of an operating system kernel/VMM.

While it would be best to have the RTM actually place a tickHash value early into a PCR that is already defined (such as PCR-1, PCR-3 or PCR-6), for most cases, it is sufficient for the measured OS kernel to place the tichHash measurement into a PCR that is not already in use. It is proposed that for static measurements, the tickHash be extended into PCR-11 (to reflect the freshness of subsequent load-time IMA measurements). In support of DRTM, it is suggested to extend the tickHash into PCR-19 immediately after a DRTM hypervisor is loaded by the hypervisor kernel. The stability of the tickHash reference point is assured because PCR-11 can only be reset by a full reboot sequence of the system and PCR-19 can only be reset by going through a reboot of the VT-x (in the case of Intel) or Pacifica (in the case of AMD) cycle. In both the latter cases, PCR-19 will then reflect a value as to when the late booting of a hypervisor took place.

Despite the difficulties described earlier for integrating a tickHash solution with other measurement components, the benefits of this approach should be noted. To describe the basic principles behind this approach, an analogy to the scientific laws employed in geology is presented. In order to determine the age of fossils buried in the earth, geologist use the Law of Superposition. The law, which applies to stratified deposits of rock and minerals, states that older layers of deposits are found at the bottom of a stratum while newer layers are found closer to the top. The age of a fossil can be determined by establishing the location of a fossil with the stratum. This same principle is the basis for the novel idea of provable fresh measurements, which helps to identify the relative age or freshness of measurements quoted from a TPM.

Values extended into TPM's PCRs behave in a similar fashion to the Law of Superposition because of the one-way SHA-1 function used by TPM to extend a PCR. The one-way nature of the hash function guarantees the chronological ordering of the measurements in the PCR. Older measurements occur earlier in the sequence and new measurements occur later in the sequence. In terms of the Law of Superposition, extending a tickHash into a PCR is similar to injecting the tickHash in the PCR's "stratum". Because the age of the tickHash relative to boot is known, the age of other measurements extended before or after the tickHash can be established.

In order to establish a relative time of a measurement, it needs to be recorded in a PCR between two time events. Those could be 1) initial boot and a tickHash, 2) between a tickHash and current time, or 3) between two tickHashes. In order to more precisely determine the freshness of measurements, the first tickHash should be extended as soon as possible (after SRTM, DRTM) to establish an initial temporal reference for earlier measurements and all later measurements. Extending other tickHashes interspersed with other measurements helps to accurately determine the relative age of those measurements between the tickHashes—similar to the Law of Superposition. As an example, FIG. 4 illustrates this principle as applied to PCR-7.

Figure 4:
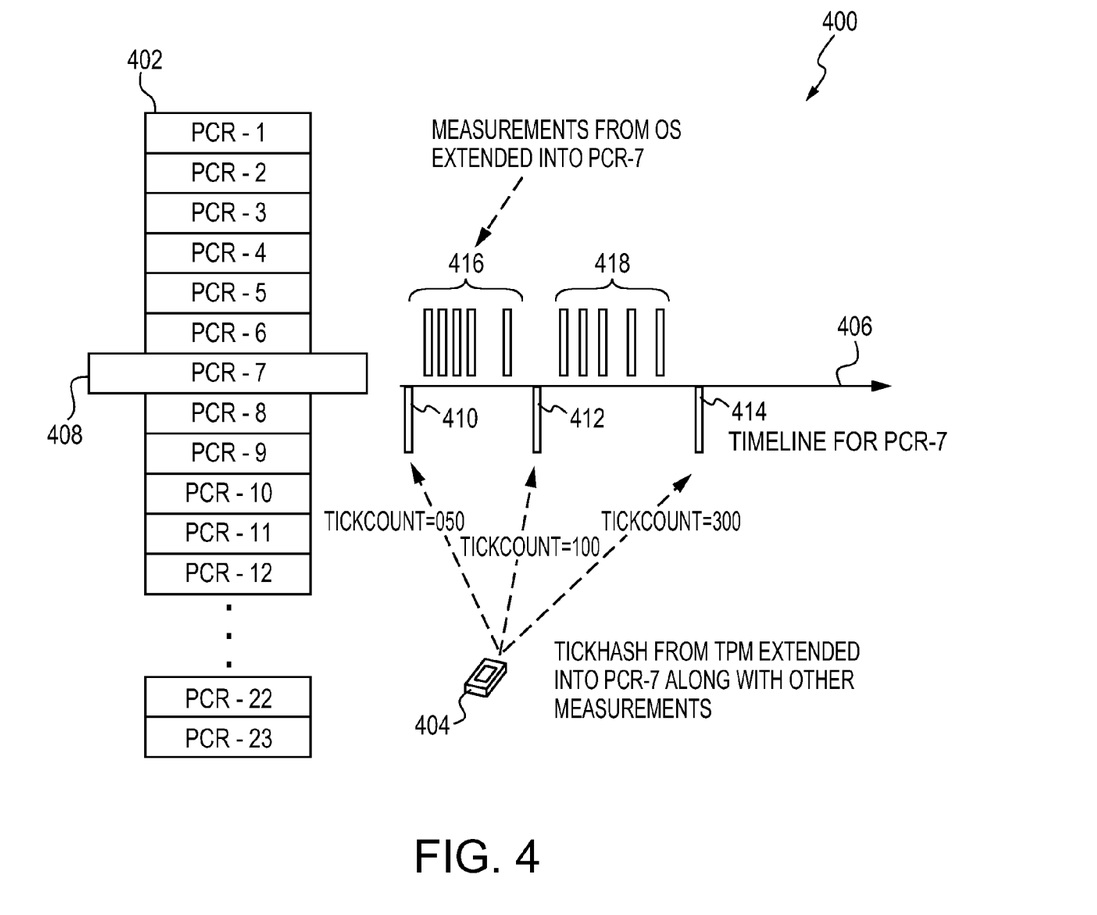
FIG. 4 illustrates an example of applying the law of superposition to PCR-7 with a tickHash.

FIG. 4 illustrates an example 400 of applying the Law of Superposition to PCR-7 with a tickHash.

As illustrated in the figure, 402 represents a set of PCRs, where PCR-7 is represented by 408. An x-axis 406 represents a timeline for PCR-7 408. A TPM 404 extends tickHash into PCR-7 108 at times 410, 412 and 414. Measurements from the operating system (OS) are extended in to PCR-7 408 are shown as 416 and 418.

An initial tickHash is extended in to PCR-7 408 at time 410, when tickCount is equal to 050. Between time 410 and time 412, several other software measurements are recorded, which are extended into PCR-7 408, as shown by 416. At time 412, tickCount is equal to 100. Between time 412 and time 414, some other software measurements are recorded, which are extended into PCR-7 408, as shown by 418. At time 414, tickCount is equal to 300.

As seen from FIG. 4, extending tickHashes interspersed with other software measurements help to establish the relative age of the measurements between them. Similar to the Law of Superposition, knowing the age of tickHashes at times 410, 412 and 414, the age of measurements 416 and 418 can be determined accurately.

As discussed above and in accordance with aspects of the present invention, provably fresh measurements are used to solve the stale measurement problem in remote attestation. The tickCount and tickStamp capabilities of TPM are utilized to establish a temporal reference point that can be cryptographically associated with measurements protected by TPM in a way that can be verified by a remote attester. By associating a temporal reference point with measurements protected in TPM, the relative time a measurement was recorded into TPM can be proven. A time stamp is associated with the measurements protected by the TPM by extending a representative hash of the time into the targeted PCR. Since the code that measures the tickStamp into an unused PCR would have itself been measured, the attestee can verify that the measurement into the unused PCR was done at roughly the same time as the boot for the computer.

The technique behind provably fresh measurements also solves "reboot in the middle" problem associated with remote attestation. The basic approach of generating a tickHash in order to associate time (i.e., the tickCount) with a measurement, is applied in two basic scenarios. In the method of Establishing Relative Boot Time, any modifications to current trusted code in the BIOS or any modifications to the TPM to establish freshness of measurements is not required. Another method based on Law of Superposition, integrates the provably fresh measurement technique of extending tickHashes together with other measurement software to establish a relative time of measurements recorded in PCRs. In another embodiment the tickStamping may be integrated with the RTM measurements taken at the boot time.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A method for determining with a first device, staleness of attestation measurements at a second device, said method comprising:
    booting up the second device at a first time, the second device having a communication portion, a security portion, a basic input/output system and a trusted protection module;
    generating an initial counter based on said booting up the second device at the first time;
    generating a current counter based on a second time after the first time;
    providing a request to the second device from the first device, the request requesting booting information and current information, the booting information being based on the initial counter, the current information being based on the current counter;
    providing a response to the first device from the second device, the response including the booting information and the current information; and
    determining, via the first device, the generated initial counter and the current counter based on the response,
    wherein said providing a request to the second device from the first device comprises providing a first request and providing a second request,
    wherein said providing the second request for the current information to the second device from the first device comprises providing a nonce to the second device from the first device, and
    wherein said providing a response to the first device from the second device comprises providing the response to include the nonce.

2. The method of claim 1,
    wherein said providing a first request comprises providing the first request for the booting information to the second device from the first device, and
    wherein said providing a second request comprises providing the second request for the current information to the second device from the first device.

3. The method of claim 2, wherein said generating an initial counter based on said booting up the second device at the first time comprises storing the initial counter in a platform configuration register of a trusted platform module.

4. The method of claim 3, wherein said generating a current counter based on a second time after the first time comprises storing the current counter in a platform configuration register of a trusted platform module.

5. The method of claim 4, further comprising determining the time between the generated initial counter and the current counter by determining the difference $T_{fresh}$ between the generated initial counter and the current counter as a difference between a $tickCount_A$ from a recorded tickHash, and the current tickCount, $tickCount_{cur}$, where $$T_{fresh} = tickCount_{cur} - tickCount_A.$$

6. The method of claim 1, wherein said generating an initial counter based on said booting up the second device at the first time comprises storing the initial counter in a platform configuration register of a trusted platform module.

7. The method of claim 1, wherein said generating a current counter based on a second time after the first time comprises storing the current counter in a platform configuration register of a trusted platform module.

8. A non-transitory computer-readable media having computer-readable instructions stored thereon, the computer-readable instructions being capable of being read by a computer to be used for determining with a first device, staleness of attestation measurements at a second device, the tangible computer-readable instructions being capable of instructing the computer to perform the method comprising:
  booting up the second device at a first time, the second device having a communication portion, a security portion, a basic input/output system and a trusted protection module;
  generating an initial counter based on said booting up the second device at the first time;
  generating a current counter based on a second time after the first time;
  providing a request to the second device from the first device, the request requesting booting information and current information, the booting information being based on the initial counter, the current information being based on the current counter;
  providing a response to the first device from the second device, the response including the booting information and the current information; and
  determining, via the first device, the generated initial counter and the current counter based on the response,
  wherein said providing a request to the second device from the first device comprises providing a first request and providing a second request,
  wherein said providing the second request for the current information to the second device from the first device comprises providing a nonce to the second device from the first device, and
  wherein said providing a response to the first device from the second device comprises providing the response to include the nonce.

9. The non-transitory tangible computer-readable media of claim 8, the computer-readable instructions being capable of instructing the computer to perform said method
  wherein said providing a first request comprises providing the first request for the booting information to the second device from the first device, and
  wherein said providing a second request comprises providing the second request for the current information to the second device from the first device.

10. The non-transitory tangible computer-readable media of claim 9, the computer-readable instructions being capable of instructing the computer to perform said method wherein said generating an initial counter based on said booting up the second device at the first time comprises storing the initial counter in a platform configuration register of a trusted platform module.

11. The non-transitory tangible computer-readable media of claim 10, the computer-readable instructions being capable of instructing the computer to perform said method wherein said generating a current counter based on a second time after the first time comprises storing the current counter in a platform configuration register of a trusted platform module.

12. The non-transitory tangible computer-readable media of claim 8, the computer-readable instructions being capable of instructing the computer to perform said method wherein said generating an initial counter based on said booting up the second device at the first time comprises storing the initial counter in a platform configuration register of a trusted platform module.

13. The non-transitory tangible computer-readable media of claim 8, the computer-readable instructions being capable of instructing the computer to perform said method wherein said generating a current counter based on a second time after the first time comprises storing the current counter in a platform configuration register of a trusted platform module.

14. A device for use with an attester, the attester being operable to transmit a request for booting information and current information, said device comprising:
  a communication portion operable to receive the request;
  a basic input/output system having a root of trust measurement portion, said basic input/output system being operable to boot up at a first time, said root of trust measurement portion being operable to generate boot information based on said input/output system booting up;
  a trusted platform module having a tick counter and a plurality of platform configuration registers, said tick counter being operable to provide a first tickcount corresponding to the first time and a second tickcount corresponding to a second time after the first time; and
  a security portion,
  wherein said root of trust measurement portion is further operable to store first information and second information in said plurality of platform configuration registers, the first information being based on the boot information and the first tickcount, the second information be based on the second tickcount, and
  wherein said communication portion is further operable to transmit a response to the attester based on the first information and the second information,
  wherein the request includes a nonce,
  wherein said security portion is operable to generate the response based on the nonce and the first information.

15. The device of claim 14, wherein said security portion is operable to generate the response additionally based on the second information.

* * * * *